(12) United States Patent
Nayak et al.

(10) Patent No.: US 7,533,088 B2
(45) Date of Patent: May 12, 2009

(54) DATABASE REVERSE QUERY MATCHING

(75) Inventors: Tapas Kumar Nayak, Sammamish, WA (US); Feng Tian, Bellevue, WA (US); Nimish Khanolkar, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 226 days.

(21) Appl. No.: 11/121,418

(22) Filed: May 4, 2005

(65) Prior Publication Data

US 2006/0253410 A1 Nov. 9, 2006

(51) Int. Cl.
*G06F 17/30* (2006.01)
(52) U.S. Cl. ............... 707/4; 707/3; 707/5; 707/10
(58) Field of Classification Search ............ 707/1, 707/3, 2, 4, 5, 6
See application file for complete search history.

(56) References Cited

U.S. PATENT DOCUMENTS

| | | | | |
|---|---|---|---|---|
| 5,488,725 | A * | 1/1996 | Turtle et al. | 707/5 |
| 6,363,378 | B1 * | 3/2002 | Conklin et al. | 707/5 |
| 6,681,222 | B2 * | 1/2004 | Kabra et al. | 707/5 |
| 6,718,320 | B1 * | 4/2004 | Subramanian et al. | 707/2 |
| 6,741,981 | B2 * | 5/2004 | McGreevy | 707/3 |
| 6,853,992 | B2 * | 2/2005 | Igata | 707/3 |
| 7,146,361 | B2 * | 12/2006 | Broder et al. | 707/5 |
| 7,305,436 | B2 * | 12/2007 | Willis | 709/204 |
| 2001/0047355 | A1 * | 11/2001 | Anwar | 707/5 |
| 2002/0123994 | A1 * | 9/2002 | Schabes et al. | 707/5 |
| 2003/0145001 | A1 | 7/2003 | Craig et al. | |
| 2003/0195873 | A1 * | 10/2003 | Lewak et al. | 707/3 |
| 2004/0003097 | A1 | 1/2004 | Willis et al. | |

OTHER PUBLICATIONS

Colin McGregor, et al. Oracle Text: Application Developer's Guide Release 9.2, Mar. 2002. Part No. A96517-01. Online Corporation 2000, 2002.
International Search Report dated Sep. 28, 2007 for PCT Application Serial No. PCT/US06/08271, 2 Pages.

* cited by examiner

*Primary Examiner*—Pierre M Vital
*Assistant Examiner*—Loan Nguyen
(74) *Attorney, Agent, or Firm*—Amin, Turocy & Calvin, LLP

(57) ABSTRACT

The subject invention pertains to database reverse query matching. A text document can be received and analyzed to determine which, if any, queries the document matches. To enable such functionality, a number of intermediate structures such as tables are generated in accordance with designated queries. In particular, a canonical table can be generated that specifies the expressions or phrases as well as match rules. Furthermore, a Boolean table can be generated that specifies the Boolean relationship of expressions in canonical table. A match component or methodology can match text phrases to query phrases identified by the canonical table. An evaluation component or related methodology can subsequently utilize the Boolean table to determine if the preliminary phrase matches match the query logic.

11 Claims, 18 Drawing Sheets

| QKey | QText | LCID | Normalization |
|---|---|---|---|
| 1 | Election and "Defense Spending" | 1033 | CASE_INSENSITIVE\|ACCENT_INSENSITIVE |
| 2 | "Presidential Election" NEAR "International Relationship" | 1033 | CASE_INSENSITIVE\|ACCENT_INSENSITIVE |
| 3 | "Hurricane Ivan" | 1033 | CASE_INSENSITIVE\|ACCENT_INSENSITIVE |
| 4 | Election AND NOT "Hurricane Ivan" | 1033 | CASE_INSENSITIVE\|ACCENT_INSENSITIVE |
| 5 | "Presidential Election" OR "Defense Spending" | 1033 | CASE_INSENSITIVE\|ACCENT_INSENSITIVE |

*Fig. 8a*

| CanonId | CanonType | PHRASE TEXT | PHRASE ID | NORM_KEYWORD | OCCURRENCE | TEXT_KEYWORD | ALT ID | MATCH OP |
|---|---|---|---|---|---|---|---|---|
| 1 | PHRASE | Election | 1 | 0x0065006C00650063 00740069006F006E | 1 | Election | 0 | 0 |
| 2 | PHRASE | Defense Spending | 2 | 0x006400650066006500 06E00730065 | 1 | Defense | 0 | 0 |
| 2 | PHRASE | Defense Spending | 2 | 0x0073007000650006E 006400690006E0067 | 2 | Spending | 0 | 0 |
| 3 | PROXIMITY | Presidential Election | 3 | 0x007000720065007300 06900640065006E007 40069006100C | 1 | Presidential | 0 | 0 |
| 3 | PROXIMITY | Presidential Election | 3 | 0x0065006C00650063 00740069006F006E | 2 | Election | 0 | 0 |
| 3 | PROXIMITY | International Relationship | 4 | 0x0069006E00740065 0072006E00610074000 69006F006E0061006C | 1 | International | 0 | 0 |
| 3 | PROXIMITY | International Relationship | 4 | 0x0072006500C0061 00740069006F006E00 7300680069007 | 2 | Relationship | 0 | 0 |
| 4 | PHRASE | Hurricane Ivan | 5 | 0x00680075007200720 069006300610006E006 5 | 1 | Hurricane | 0 | 0 |
| 4 | PHRASE | Hurricane Ivan | 5 | 0x0069007600610006E | 2 | Ivan | 0 | 0 |

Fig. 8b

| ChildExpressionId | BooleanWt | ParentExpressionId | ParentTargetWt |
|---|---|---|---|
| 1 | 1 | 5 | 2 |
| 2 | 1 | 5 | 2 |
| 3 | 0 | 0 | 0 |
| 4 | 0 | 0 | 0 |
| 1 | 1 | 6 | 1 |
| 4 | -1 | 6 | 1 |
| 3 | 1 | 7 | 1 |
| 2 | 1 | 7 | 1 |
| 5 | 0 | 0 | 0 |
| 6 | 0 | 0 | 0 |
| 7 | 0 | 0 | 0 |

760

| ExpressionId | QKey |
|---|---|
| 5 | 1 |
| 3 | 2 |
| 4 | 3 |
| 6 | 4 |
| 7 | 5 |

Fig. 8e

DATABASE REVERSE QUERY MATCHING

TECHNICAL FIELD

The subject invention relates generally to databases and database management systems (DBMS) and more particularly toward database query systems and methods.

BACKGROUND

Database systems are quite prevalent in today's world. Databases store large quantities of information in such a manner to facilitate expeditious querying and ease of use. Databases are organized collections of related information or data. Most databases store data in a plurality of multidimensional tables. Tables contain a series of rows also referred to as records. Each row provides particular information about a particular thing such as a customer. Rows are divided into sections called columns. The intersection between a row and column is referred to as a field. Each field provides data or information related to a particular thing. The columns specify the particular type of data provided in each field. For example, a table can be established for purchases of a particular product. The table can include a plurality of rows corresponding to individual customers, and several columns for first name, last name, address, state, zip code, number of products purchased, price, date, etc.

Database engines or management systems provide a means and mechanism to retrieve and manipulate data from database tables upon specification of a query by a user. A query is typically expressed in some query language such as Structured Query Language (SQL). Queries specify the data to be retrieved from a database. Therefore, a query can specify one or more tables as well as the rows to be retrieved and any data operations or manipulations to be performed. Upon proper specification of a query, the database engine retrieves data, performs any specified operations and produces a results table.

Additionally, some database systems support full-text queries to facilitate location of items in a table, which satisfy a full text query. An example of such a query in SQL is SELECT * from ResumeTable where contains (ResumeText, '"SQL Server" AND DBA', which finds all resumes from a table of resumes where ResumeText contains the phrase "SQL Server" and the term "DBA." In a news application, a query could be SELECT * from CurrentNews where contains (NewsText, 'Election AND "Defense Spending"'), which retrieves the news items including the term "Election" and the phrase "Defense spending" from the CurrentNews table. In any event, queries are conventionally specified and then executed on database data to retrieve a result set.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Briefly described the subject invention concerns reverse query matching systems and methods. Rather than executing queries on data as is conventionally done, the subject invention provides an antithetical approach where received data is analyzed and matched to queries, which can be stored in a database. Systems and methods supporting and implementing such an approach can be employed, among other things, to facilitate document classification as well as notification. For example, one or more queries can be specified defining classes or categories. Upon receipt of a document, the document text can be matched to a query or class. As per notification, users can specify queries describing documents that are of interest. Received documents can then be analyzed and matched to users' queries. Notification can be provided to a user when the system matches one or more documents to a user specified query.

According to an aspect of the subject invention, a reverse query system can include a match component and an evaluation component. The match component can receive text and match items and phrases to query items and phrases. The evaluation component can receive these preliminary matches and determine whether the text items and phrases satisfy query logic including but not limited to Boolean relationships.

The match component can include a myriad of subcomponents in accordance with an aspect of the invention. In particular, a phrase component can be included to match text items and phrases to queries. A proximity component can limit the match items based on the proximity of items and phrases relative to each other. A thesaurus component can enable matching of synonyms and an inflection component can aid in matching inflective forms of terms and phrases. Additionally, the match component can include a pattern component that facilitates matching of portions of items or phrases.

In accordance with another aspect of the invention, the reverse query system can include a relevance component. The relevance component can analyze a document text and provide a relevance value for each matching query to identify the most relevant or best match amongst a plurality of matches.

The system can also include a relational component, in accordance with an aspect of the invention. The relational component can receive and/or retrieve non-full text data or metadata associated with a text document. Such relational information can be supplied to the evaluation component to enable matching of queries with relational restrictions including but not limited to the publication date, last update date, and author.

According to another aspect of the invention, systems and methods are provided to support reverse query matching. A query table is defined including, among other things, one or more queries and identifiers. From the query table, multiple intermediate structures such as tables can be generated. More specifically, a canonical table can be generated providing data to facilitate matching of text items and phrases to query items and phrases. A Boolean table can be generated that encodes the Boolean relations of canonical expressions. Further, a final expression table can be generated that maps canonical expressions specified by the canonical table and Boolean table to the original query table to facilitate identification of matching queries.

According to still another aspect of the invention, systems and methods are provided for interacting with the support structures to match queries. Matching functions including but not limited to phrase and proximity matching can employ the canonical table to identify matching query items or phrases. Query logic such as Boolean relationships can be evaluated utilizing the Boolean table. More specifically, an iterative transitive closure methodology can be implemented that identifies query expression identifiers that match one or more queries. The expression identifiers can then be utilized to determine a query identifier used in the query table to identify specific queries from the final expression table.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

FIG. 8a is an exemplary query table in accordance with an aspect of the subject invention.

FIG. 8b is an exemplary canonical table in accordance with an aspect of the subject invention.

FIG. 8e is an exemplary final expression table in accordance with an aspect of the subject invention.

DETAILED DESCRIPTION

The present invention is now described with reference to the annexed drawings, wherein like numerals refer to like or corresponding elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

As utilized herein, the term "phrase" is intended to include one or more items. For example, "Defense Spending" and "Election" are both phrases.

Furthermore, the present invention may be implemented as a method, apparatus, or article of manufacture using standard programming and/or engineering techniques to produce software, firmware, hardware, or any combination thereof to control a computer to implement the disclosed invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

Figure 1:
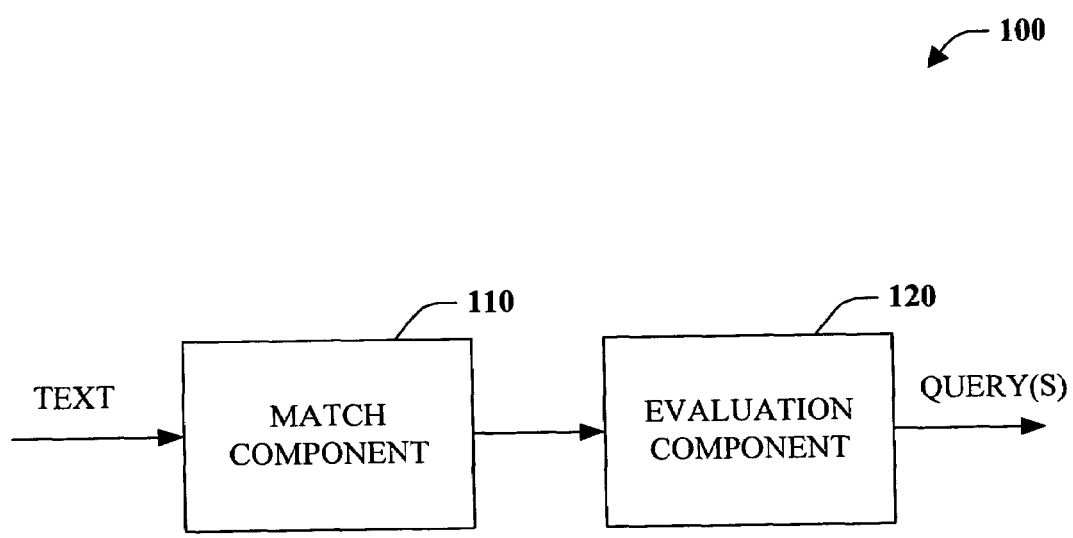
FIG. 1 is a block diagram of a reverse query system in accordance with an aspect of the subject invention.

Turning initially to FIG. 1, a reverse query system 100 is illustrated in accordance with an aspect of the subject invention. System 100 includes a match component 110 and an evaluation component 120. Match component 110 can receive a parsed and word broken text document. By way of example and not limitation, the text document can be a word processing document, a spreadsheet, files (e.g., portable document format (PDF), postscript . . . ), an HTML (Hyper Text Markup Language) document, an XML (eXtensible Markup Language) document, an email, instant message, a log, and a binary file. Such documents can be parsed and word broken by one or more components of a query evaluation engine as part of a database management system, for instance. Upon receipt of document text, match component 110 can match one or more text expressions or phrases to query phrases. As will be described in further detail infra, the match component 110 can generate a table or other data structure identifying the matching phrases by identifiers, for example. Evaluation component 120 is communicatively coupled to the match component 110. Accordingly, evaluation component can receive or retrieve data or information from the match component 110. In particular, evaluation component 120 can receive or retrieve information, for example from inter-component data transmissions, identifying the expressions or phrases that match zero or more query phrases. Evaluation component 120 can analyze the initial matches with respect to query logic or operations. For instance, queries can be specified utilizing Boolean operations including but not limited to "AND," "OR," "NOT," and combinations thereof. For example, a query can be specified as "X AND Y," "X OR Y," or "X ANDNOT Y." Evaluation component 120 can determine which, and whether, the initially matching expressions satisfy logic constraints such as Boolean operations. Subsequently, the evaluation component 120 can output or otherwise identify the queries a document or, more specifically, a document's text matches.

It should be appreciated that the subject invention contemplates employment of reverse query system 100 in a myriad of larger systems. For example, system 100 can be utilized to facilitate classification of documents. In such a situation, the queries can define classes or categories and reverse query system 100 can facilitate classification of documents via matching. By way of example, as a new news item appears, reverse query matching on the new item can be applied to the item to classify the item into zero or more categories defined by one or more queries. Reverse query system 100 can also be employed with respect to notification systems. For instance, a user can subscribe to a service that provides notification to the user in accordance with particular rules. Queries can define the rules or interests of a service subscriber. The reverse query system 100 can then be employed to analyze new and incoming documents and determine if they match a subscriber's queries. Upon detection of a match, the subscriber can be notified. Furthermore, depending upon notification options and settings the matching document could be transferred or identified to the subscriber, for example on a computer or mobile device.

Figure 2:
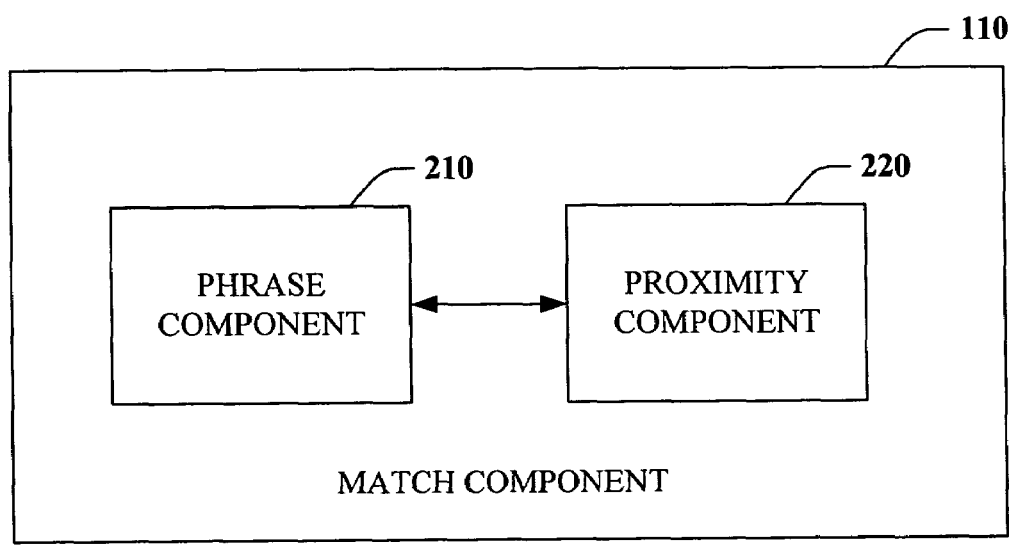
FIG. 2 is a block diagram of a match component in accordance with an aspect of the subject invention.

Turning to FIG. 2, a match component 110 is illustrated in accordance with an aspect of the subject invention. Match component 110 includes a phrase component 210 and a proximity component 220. Match component 110 provides for identification of preliminary query matches. Phrase component 210 identifies text expressions that match query phrases. For example, if a query specified "President" and "defense spending" and the received text was "Congress approves the defense budget of the President," then the phrase component would identify solely the term or expression "President." Assuming the same query, if the received text was "Many have castigated the President for his limitless defense spending," the phrase component 210 can identify the term "President" and the phrase "defense spending." Additionally, it should be appreciated that phrase component 210 can be designed to be case and accent sensitive or insensitive based on preferences provided by a user or application or based on default settings.

Phrase component 210 can be communicatively coupled to proximity component 220. Proximity component 220 can limit the items or phrases identified by phrase component 210 based on the proximity of the terms or phrases relative to one another. For example, query terms or phrases can include proximity terms such as "near" or more specifically within a number of words or items, such as "w/5" denoting that the terms separated thereby are within five words of each other. By way of example, assume a query is specified such that the term "President" and the phrase "defense spending" are within two words of each other. Phrase component 210 can identify both "President" and "defense spending" for the text "Many have castigated the president for limitless defense spending." The proximity component 210 can then negate their identification because the items are not within two words of each other.

Figure 3:
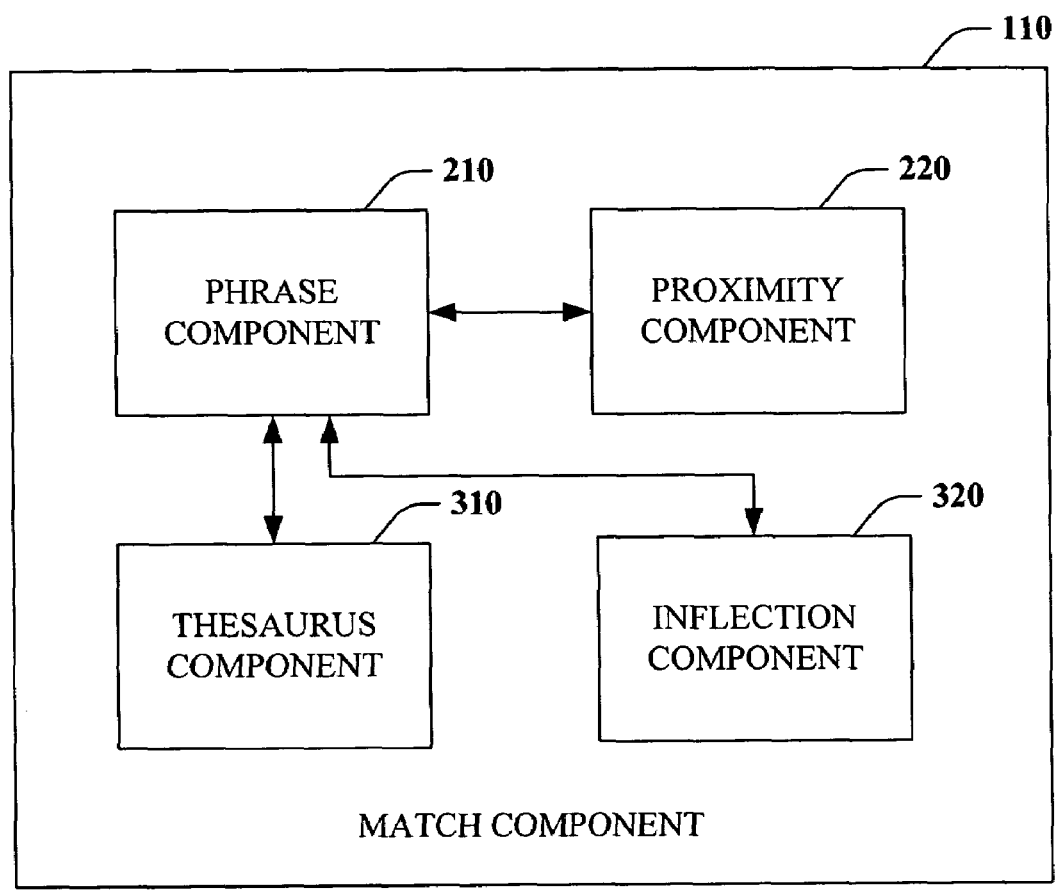
FIG. 3 is a block diagram of a match component in accordance with an aspect of the subject invention.

FIG. 3 illustrates a match component 110 in accordance with an aspect of the subject invention. Match component 110 includes a phrase component 210, a proximity component 220, a thesaurus component 310, and inflection component 320. As described with respect to FIG. 2, phrase component 210 is operable to identify query items such as terms and phrases from text. Proximity component 220 can limit or negate identification of particular items from text based on the proximity of the items relative to each other. Text items include terms and phrase that do not always match the exact query terms or items, nevertheless it is often desirable that like items be matched thereto. Thesaurus component 310 identifies synonyms of items or phrases, for example, the phrase "electoral process" can be identified as a synonym and matched to a query phrase "Presidential election." Inflection component 320 provides similar linguistic processing in that it can expand item identification to inflectional forms of words. For instance, terms such as "runs," "running," "ran," and the like can match with the query item "run."

Figure 4:
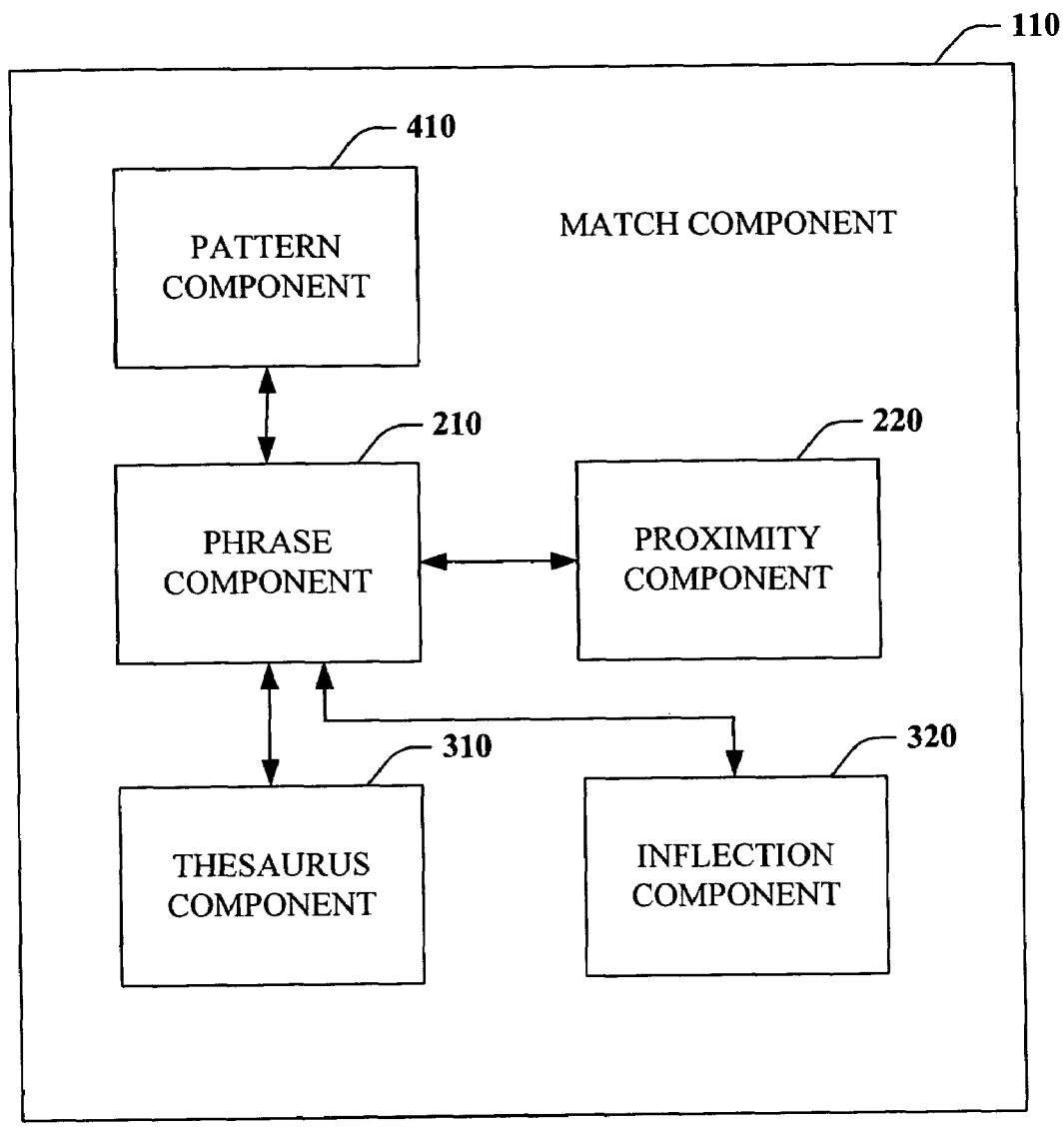
FIG. 4 is a block diagram of a match component in accordance with an aspect of the subject invention.

FIG. 4 depicts a match component 110 in accordance with an aspect of the subject invention. Similar to FIG. 3, match component 110 can include phrase component 210, proximity component 220, thesaurus component 310, and inflection component 320. Phase component 210 identifies items or groups of items or phrases from within text that match query phrases or items. Proximity component 220 can limit or negate the items identified by phrase component 110 based on the proximity of terms relative to each other. Thesaurus component 310 increases the number of matches by identifying synonyms of phrases. Inflection component 320 increases the number of matches by identifying inflectional forms of words. In addition to these components, match component 110 can include a pattern component 410. Pattern component 410 can facilitate identification and matching of portions of items or phrases including but not limited to prefixes and suffixes. By way of example, a query term could specify or identify a prefix "pres." In such a scenario, pattern component 410 can identify matches for such terms including but not limited to "press," "president," "presidential," and "presentation." In another example, the query term could specify or identify the phase suffix "Bush," and pattern component can identify matches such as "George Bush," "George W. Bush," "Barbara Bush," "Laura Bush," and the like. Alternatively, a pattern could specify a wildcard in-between a prefix and a suffix e.g. pr*tion to match all words like "presentation", "presumption" etc.

Figure 5:
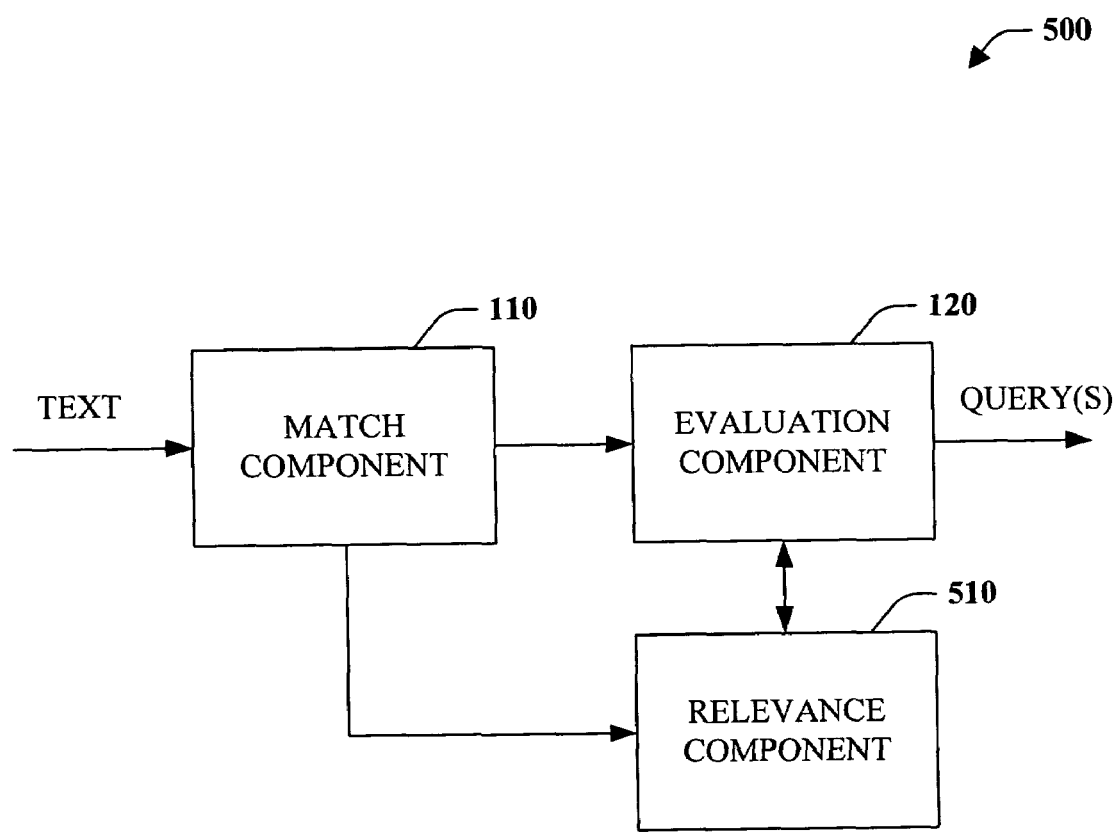
FIG. 5 is a block diagram of a reverse query system including a relevance component in accordance with an aspect of the subject invention.

Turning to FIG. 5, a reverse query system 500 is illustrated in accordance with an aspect of the subject invention. Reverse query system 500 analyzes text and determines matching queries or queries that would be satisfied based on the text. System 500 includes a match component 110, an evaluation component 120, and a relevance component 510. Match component 110 receives text, for example from a document, and identifies query items or phrases that are included in the text. Accordingly, match component performs a preliminary match operation. Evaluation component evaluates the preliminary matches against query logic such as Boolean relationships between the items or expressions. Based on this evaluation queries that match the text can be identified. Relevance component 510 can be communicatively coupled to the match component 120 and the evaluation component 120. Relevance component 510 determines the relevance of each query match. For each matching query determined by evaluation component 120, relevance component 510 can analyze the text and determine the relevance of each query relative to the others. For example, if a first query match included ten of the matching terms and a second query match included only five of the matching terms then the first query is more germane than the second. Relevance component can thus associate a relevancy value or number with each matching query. This can be utilized to display matching queries in order of relevancy and/or to determine how to classify a document when multiple queries match.

Figure 6:
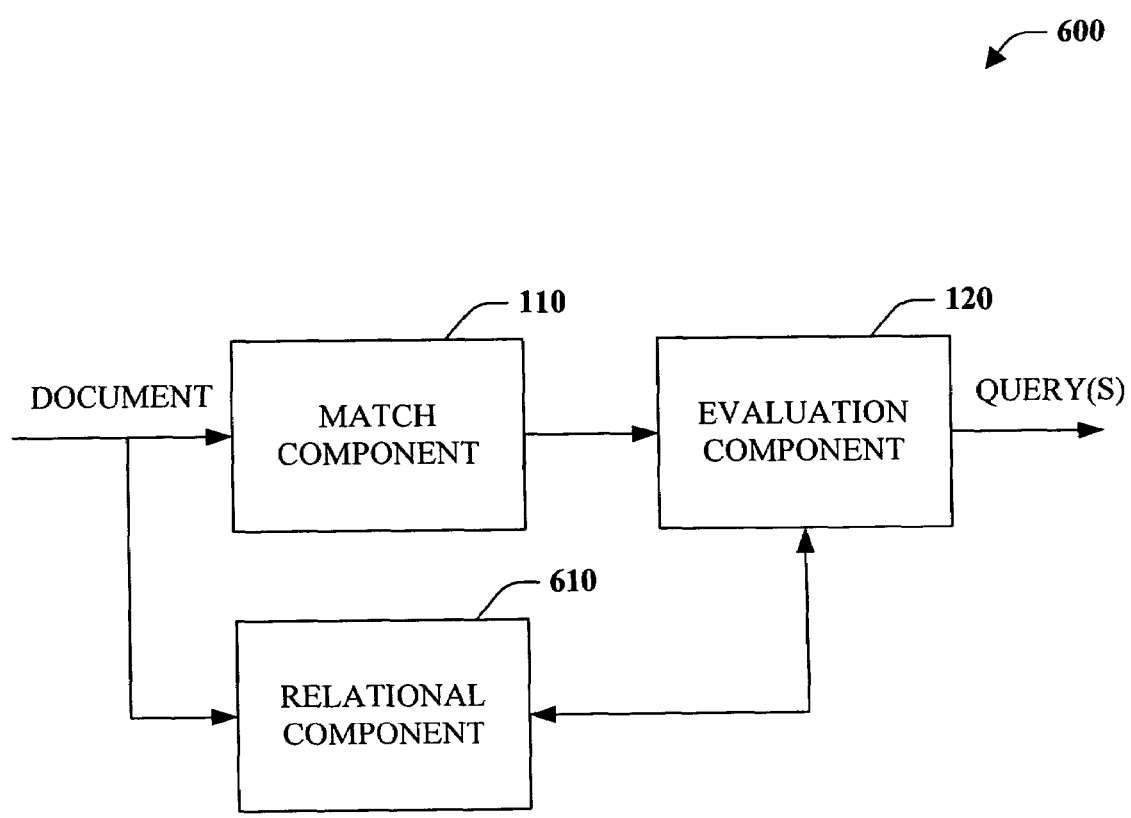
FIG. 6 is a block diagram of a reverse query system including a relational component in accordance with an aspect of the subject invention.

FIG. 6 depicts a reverse query system 600 in accordance with an aspect of the subject invention. Reverse query system includes match component 110, evaluation component 120 and relational component 610. As described supra, the match component 110 analyzes text from a document and identifies query phrases that are matched by the document text. Evaluation component 120 is communicatively coupled to the match component 110 and receives the identities of the matched query phrases. The evaluation component 120 then analyzes the matches with respect to query logic including but not limited to Boolean expressions, for example "phrase A AND phrase B." Relational component 610 matches a relational predicate with a document. For example, relational component 610 can retrieve metadata concerning the document including but not limited to the author, the last-modified date, and the date of publication. The relational component 610 can then communicate such metadata to the evaluation component 120 to enable matching of queries based on such information. By way of example, a query such as "phrase A AND phrase B AND published in last month" can be matched.

Figure 7:
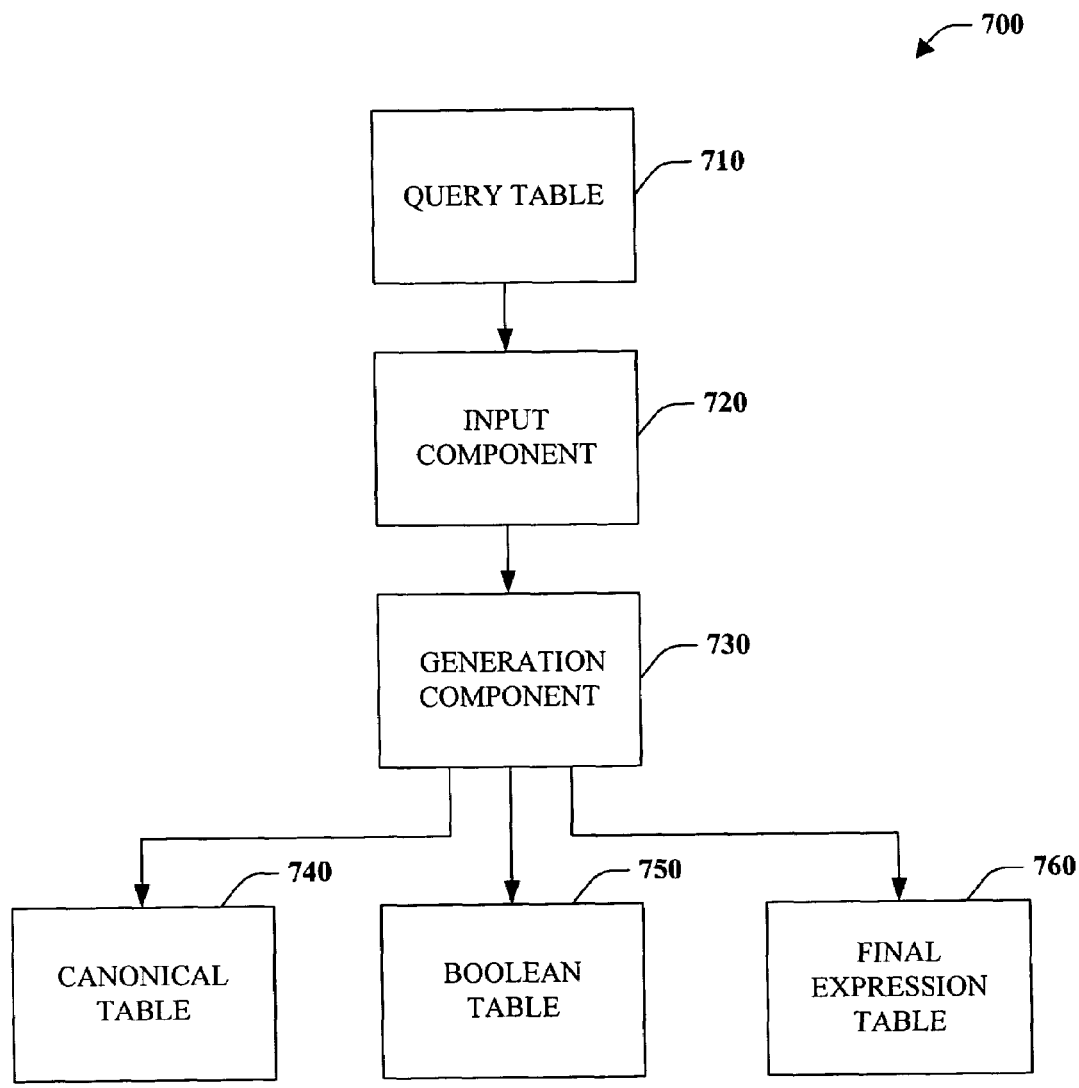
FIG. 7 is a block diagram of a reverse query support system in accordance with an aspect of the subject invention.

FIG. 7 depicts a reverse query support system 700 in accordance with an aspect of the subject invention. System 700 includes an input component 720 and a generation component 730. Input component 720 receives queries, for example, in the form of a query table 710 or other like or similar structure. The query or query table 710 can include but is not limited to one or more queries, a query identifier associated with each query, an indication of the query language (also referred to as LCID), as well as some normalization information such as whether the query is case or accent sensitive or insensitive. For purpose of clarity and understanding and not limitation, consider the exemplary query table 710 of FIG. 8a specifying five queries. The input component 720 can transmit the received information from a query table, for instance, to generation component 730. Generation component 730 can produce a number of structures to support reverse query matching. For example, generation component can produce canonical table 740, a Boolean table 750, and a final expression table 760.

Canonical table 740 can identify one or more canonical sub-expressions or phrases from the initial query text. A canonical sub-expression or phrase is a full-text query string with no logical operator (e.g., AND, OR, NOT . . . ). In addition to phrase text, the canonical table can include canon id, canon type, phrase id, normalized keyword, occurrence, text keyword, alternate id and match operator indicator. The canon id identifies each canonical sub-expression. The canon type specifies the type of the canonical expression, including but not limited to phrase or proximity. Phrase id identifies each unique phrase by an integer value. The normalized key word is a binary representation of the normalized keyword. This value can be dependent upon the type or normalization requested such as case and accent sensitive or insensitive as well as the language of the query. The text keyword identifies a keyword in textual non-normalized form. Occurrence identifies the word position of the keyword in the phrase. The alternate id indicates original and alternative words generated from a single term. For example, a zero value can indicate that it is the original term in the query. Alternate values other than zero can indicate that it was derived from the original term, such as utilizing thesaurus, inflection type and/or other linguistic transformations. The match op id indicates what type of match operation is required for the keyword including but not limited to exact, prefix, and stop word. Each of these and other operations can be identified by integer values such as zero for exact, one for prefix and two for stop word. For clarity, consider the exemplary canonical table of FIG. 8b that is generated by generation component 730 from the query table of FIG. 8a.

Figures 8C, 8D:
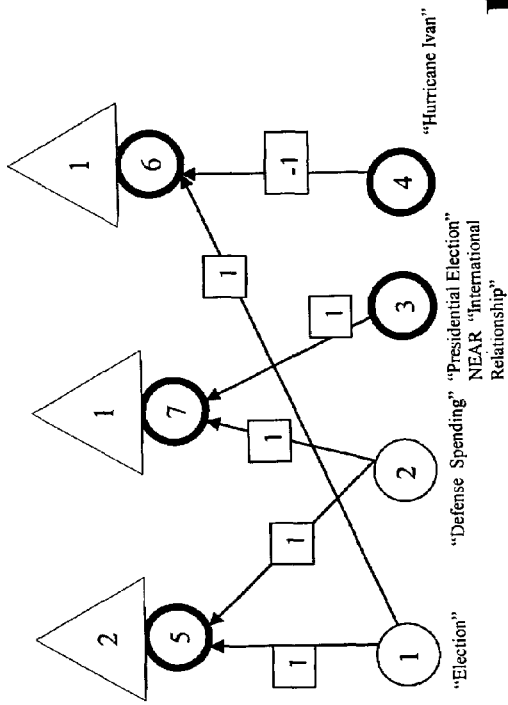
FIG. 8c is an exemplary Boolean table in accordance with an aspect of the subject invention.
FIG. 8d is an exemplary Boolean query tree in accordance with an aspect of the subject invention.

Boolean table 750 is a table that encodes the Boolean relationships of canonical expressions in the queries. In effect, the Boolean table 750 encodes a Boolean query tree that specifies parent child relationships. FIG. 8c provides an exemplary Boolean table to facilitate clarity and understanding thereof. FIG. 8d provides a graphical representation of the Boolean reverse query tree encoded by the exemplary table of FIG. 8c. The table can include four columns: child expression id, Boolean weight, parent expression id, and parent target weight. Child expression id is an integer that identifies an expression corresponding to a node in the Boolean query tree. Furthermore, it should be noted that some of the expressions correspond to the cannon ids provided in canonical table 740. Boolean weight is an integer value representing the weight of the edge joining a child node with its parent. The parent expression id is an integer identifying the parent expression id whose child expression is in the Boolean reverse query tree. The value zero in the parent expression id can indicate that the corresponding child is a root node. The parent target weight is an integer value representing the target weight for satisfying the parent node denoted by the parent expression id. Here, the specific table encodes the query tree of FIG. 8c with canonical expressions 1, 2, 3, and 4 defining the leaves and expressions 5, 6, and 7 defining composites. Expression 5 is an AND node with its two children 1 and 2. Expression 6 is an AND NOT node with 1 and not 4. Expression 7 is an OR node 3 or 2. Whenever a text item matches a canonical expression, it gets a weight of 1 for that canonical expression. The weight of a child node is multiplied by the corresponding Boolean weight (weight of the edge joining the child with its parent) and these values are summed (added) for all children to derive the weight of the corresponding parent node. A parent node qualifies for a text item and is thereby satisfied if for that text item its evaluated weight matches or exceeds the target weight of the parent. It should be noted that a node can become the child of zero or more parents. A parent node should also have only one target weight although the invention should not be construed as so limited.

FIG. 8d is provided to facilitate understanding of the generated Boolean table 750. FIG. 8d illustrates the Boolean reverse query tree or expression tree encoded by the Boolean table. It specifies the Boolean relationships between canonical expressions. Each circle represents an expression id. The lower nodes 1, 2, 3, and 4 represent the leaf nodes. The upper nodes 5, 6, and 7 are root parent nodes. The lines from node to node indicate a parent child relationship, and the boxes identify the Boolean weight of a match child. The darkened circles of nodes 3-7 indicate that these are root nodes. The triangle on top of the composite nodes 5, 6, and 7 indicate the parent target weight.

Figure 8E:
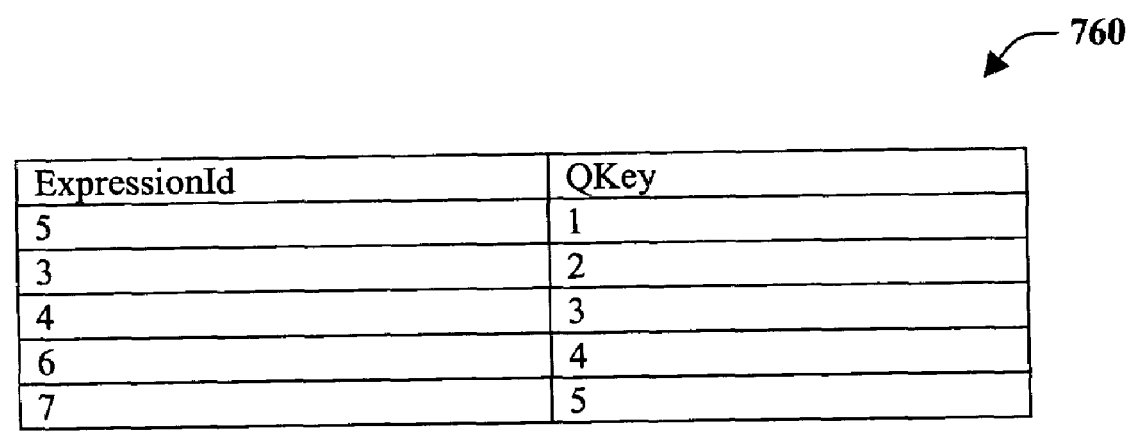

Generator component 730 can also produce a final expression table 760. The final expression table 760 maps root level expression(s) (root of Boolean query tree) back to the query key (QKey) in the original query table 710. For purposes of clarity, FIG. 8e illustrates an exemplary final expression table 760 associated with exemplary query table 710, canonical table 740 and Boolean table 750. The table has two columns expression id and QKey. The expression ids have values 3-7 that represent root nodes in the present example. QKey values correspond to the QKey values of the exemplary query table of FIG. 8a.

It should be appreciated that input component 720 and generation component 730 can be part of a compiler. Furthermore, it should be noted that several optimizations can be provided by such components and/or the compiler. In particular, while generating the canonical table, the same canonical expression id can be generated for identical canonical expressions, even thought they belong to different queries. For instance, in the canonical table of FIG. 8b "Hurricane Ivan" has the same canonical id even though it is in two different queries. Another optimization can be employed with respect to the Boolean table. While generating the Boolean table, the generation component 730 can generate the same parent expression id whenever the child expression ids as well as the corresponding Boolean weights are the same. By way of example, assume there are two common Boolean "AND" expressions such as in a first query "Foo AND Bar OR Zoo" and a second query "Foo AND Bar OR Dog." Each of Foo, Bar, Zoo, and Dog will have unique individual identifiers, say Foo is 1, Bar is 2, Zoo is 3 and dog is 4. There will also be two parents 5 for the sub-query "Foo and Bar" in first query and 6 for sub-query "Foo and Bar" in the second query. Both of the parents have the same target weight and child Boolean weights, so instead of generating parent nodes 5 and 6, the optimization provides that only one parent node 5, for instance, is generated.

The aforementioned systems have been described with respect to the interaction between several components. Furthermore, for purposes of clarity and simplicity, a number of systems were provided and described to emphasize an aspect of the subject invention. It should be appreciated that such systems can include those components specified therein, some of the specified components, and/or additional components specified in other systems. For example, match component 110 can include one or more of phrase component 210, proximity component 220, thesaurus component 310, inflection component 320, and pattern component 410 alone or in any combination or permutation thereof. Additionally, it should be noted that one or more components can be combined into a single component providing aggregate functionality or divided into several sub components. The components may also interact with one or more other components not specifically described herein but known by those of skill in the art.

Furthermore, as will be appreciated by those artisans of ordinary skill in this field, various portions of the disclosed systems may include or consist of artificial intelligence-or knowledge based components sub-components, processes or mechanisms. For example, the match component 110 of FIG. 1 may use a neural network to facilitate matching text. Furthermore, evaluation component 120 of FIG. 1 may employ classifiers that are explicitly trained, for example, using generic training data, as well as implicitly trained, such as by observing behavior or receiving extrinsic information to facilitate logical evaluation. For example, support vector machines are configured using a learning or training phase within a classifier constructor and feature selection module. Thus, the classifier(s) can be used to automatically perform a number of functions.

In view of the exemplary systems described supra, methodologies that may be implemented in accordance with the present invention will be better appreciated with reference to the flow charts of FIGS. 9-13. While for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 9:
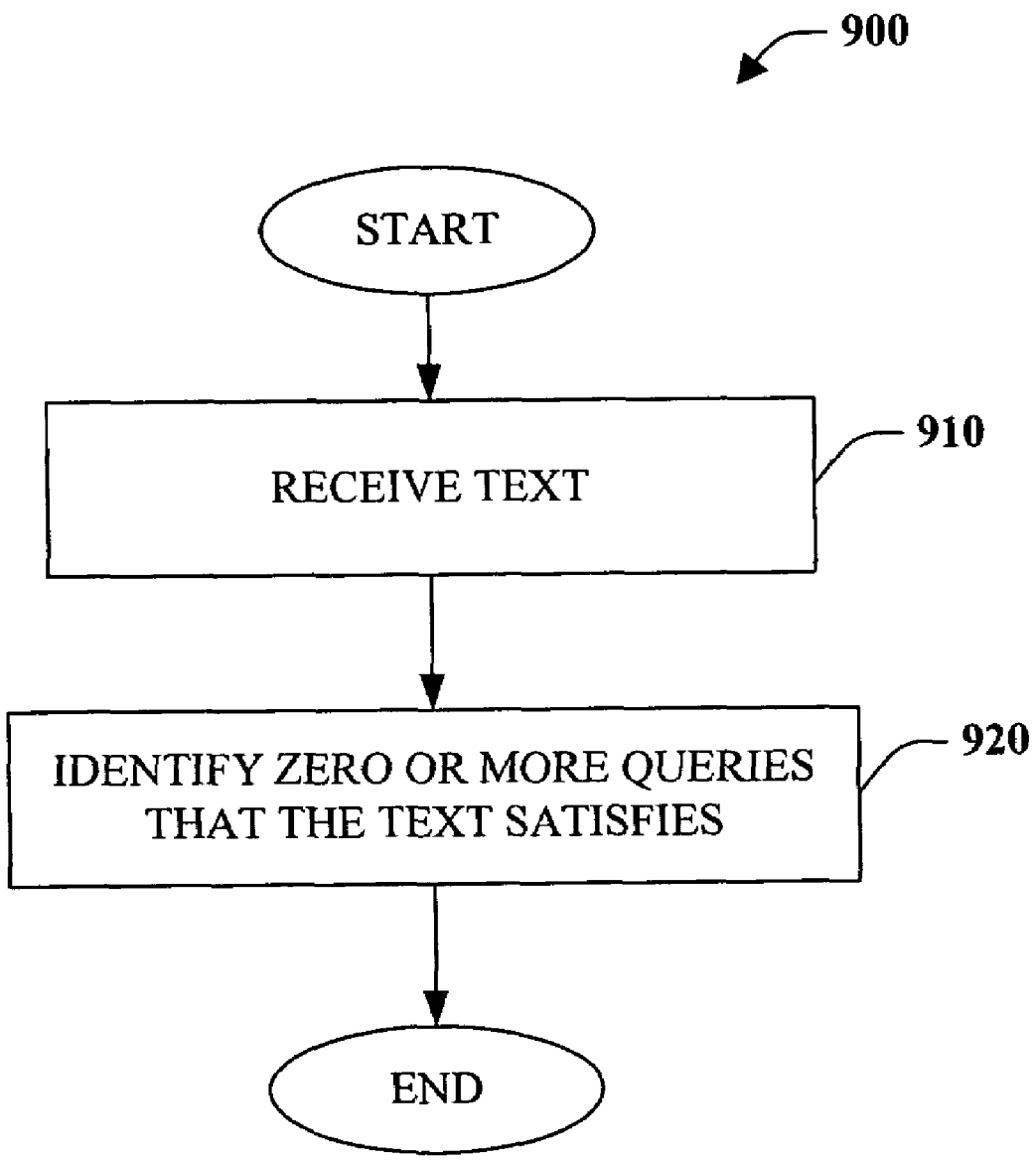
FIG. 9 is a flow chart diagram of a reverse query methodology in accordance with an aspect of the subject invention.

Turning to FIG. 9, a reverse query methodology 900 is illustrated in accordance with an aspect of the subject invention. At 910, a text is received, for example from a document. Such documents can include but are not limited to word processing documents, XML documents, HTML documents, postscript documents, PDF documents, electronic mail, and instant messages. At 920, zero or more queries are identified that the text satisfies or matches. In accordance, with an aspect of the subject invention such reverse query matching methodology 900 can be employed in the classification of documents, where the query defines a class or category. In accordance with another aspect of the invention, reverse query methodology can be employed in a notification system where notification can be sent to subscribers who define queries when a document is received and it matches one or more defined queries.

Figure 10:
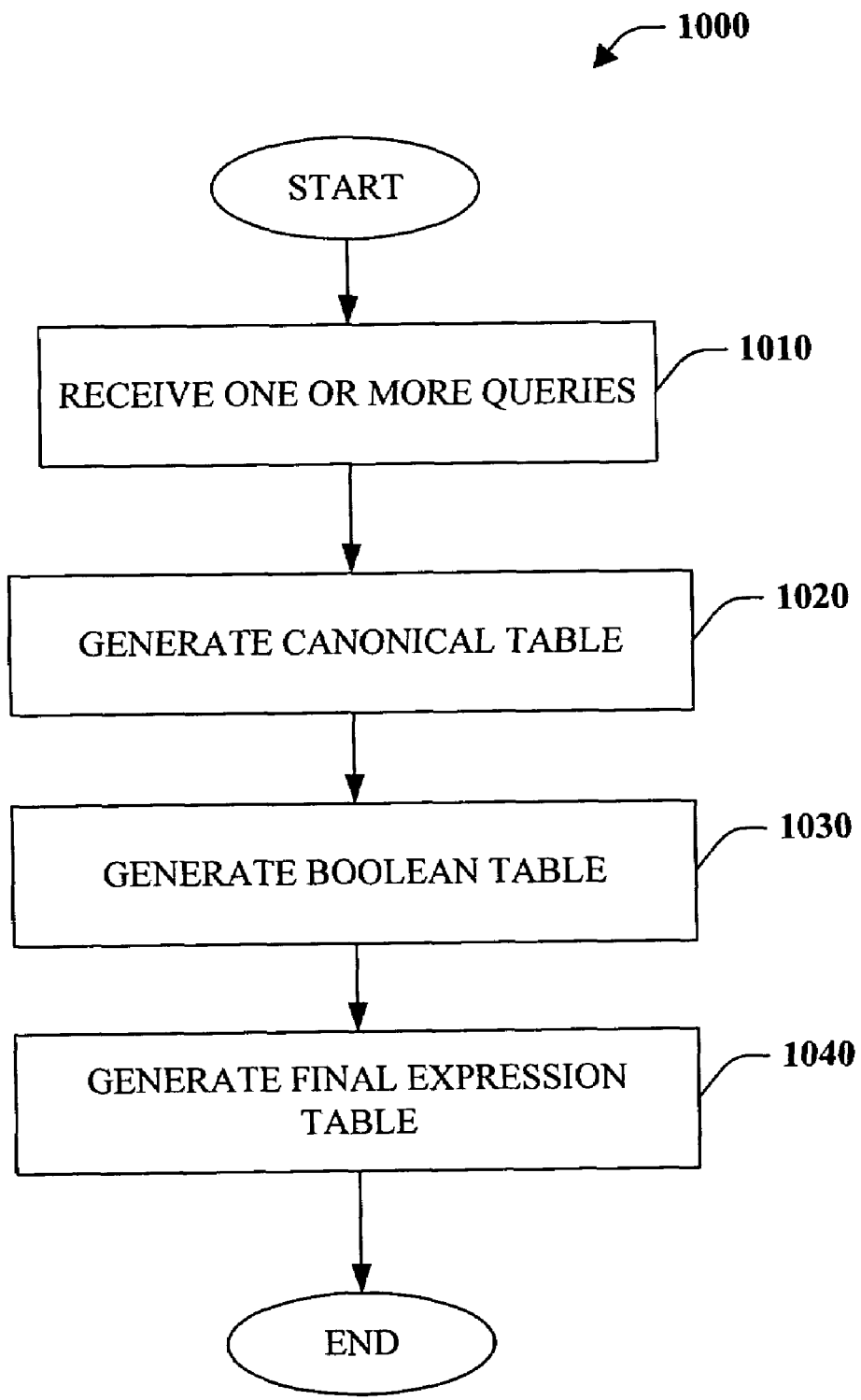
FIG. 10 is a flow chart diagram of a reverse query support methodology in accordance with an aspect of the subject invention.

FIG. 10 depicts a method 1000 of reverse query support in accordance with an aspect of the subject invention. To enable reverse query functionality support structures and/or mechanisms should be in place. Method 1000 provides one particular method of constructing a reverse query support system. Hence, it should be appreciated that many more will become apparent to those of skill in the art upon reading this specification. All of such variations are to be considered within the scope of the subject invention. At 1010, one or more queries are received. For example, such queries can be received in a query table that includes a query key, query text (e.g., Election and "Defense Spending"), language id and normalization information (e.g., case and accent sensitive or insensitive). At 1020, a canonical table is generated. The canonical table can include expressions or phrase text without logical operator such as Boolean operators, canon type including but not limited to phrase and proximity, an expression or canon identifier, phrase identifier, normalized keyword, text keyword, occurrence specifying the position of the keyword in the phrase, alternate id indicating whether the phrase is the original phrase or some linguistic derivation, and match operation identifier specifying exact, prefix or stop word matches. In accordance with an aspect of the subject invention query matching can be optimized by producing a canonical table that generates the same canonical expression identifier for identical canonical expressions even though they belong to different queries. At 1030, a Boolean table is generated that encodes the Boolean relationship of canonical expressions in the queries. Generation of the Boolean table can comprise populating the table with child expression identifiers, Boolean weights associated with the child identifiers, parent expression identifiers, and parent target weights. It should be noted that the parent child-relationship defines a Boolean reverse query tree, where the child expression ids are the leaf nodes, which are connected by branches carrying a Boolean weight and connected to parent nodes, which include parent target weights. In accordance with an aspect of the invention, reverse query matching can be optimized by generating the same parent expression identifier in the Boolean table, whenever the dependent child expression identifiers as well as the corresponding weights are the same. At 1040, a final expression table can be generated. The final expression table can map root level expressions to the corresponding specified queries in the query table via a query key. By this mechanism, queries can be identified after expression identifiers that are determined to match. The final expression table can be generated by populating expression identifiers that correspond to a root expression in a Boolean query or expression tree and query keys identifying a query string in the query table.

Figure 11:
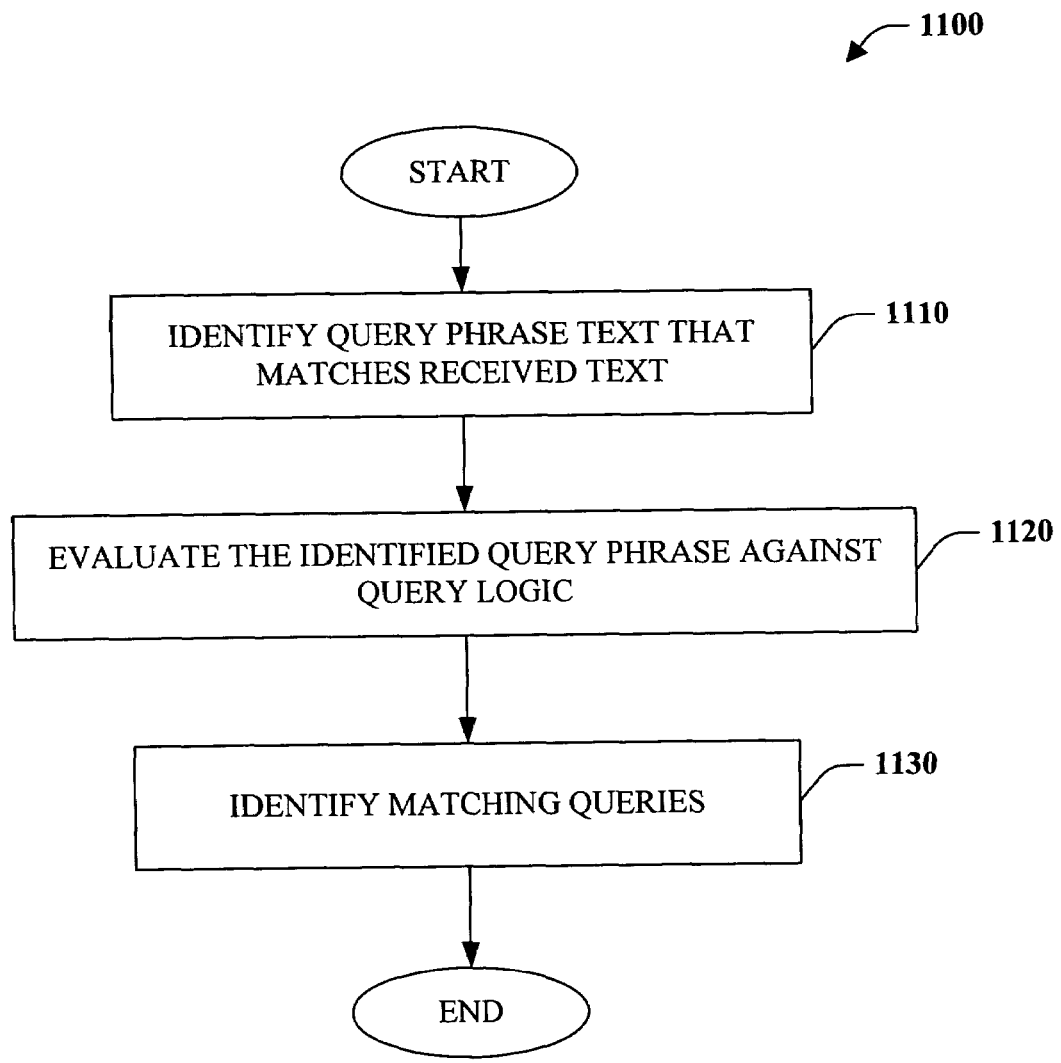
FIG. 11 is a flow chart diagram of a query matching methodology in accordance with an aspect of the subject invention.

FIG. 11 illustrates a query matching methodology 1100 in accordance with an aspect of the subject invention. At 1110, query phrase text is identified that matches receive text that is under analysis. The document text can be filtered and word broken if not already done. Furthermore, some phrase count and/or proximity count functions or methods can be employed for computation of phrases and proximity occurrences in a text given the identified phrases and proximities. In accordance, with an aspect of the invention functions for phrase and/or proximity matching can operate with respect to a generated canonical table. For example, the items, expressions or phrases in an analyzed text stream or document can be matched with respect to the phrases and proximity information provided by the canonical table. Hence, determined matches can be identified by their canonical expression id. By way of example, assume that the reverse query structures correspond to query table 710 of FIG. 8a, canonical table 740 of FIG. 8b, Boolean table 750 of FIG. 8c, and final expression table 760 of FIG. 8e. Further, assume that the document under consideration includes the text "Impact of Hurricane Ivan on Presidential Election of United States of America and international relationship." The phrases that match are "Hurricane Ivan," "Election," "Presidential Election," and "international relationship." Accordingly, the matching functions would return the expression ids from the canonical table 740 corresponding to these phrases, namely expression ids 4 corresponding to "Hurricane Ivan," 1 corresponding to "Election," and 3 corresponding to both "Presidential Election" and "International Relationship." At 1120, the identified phrases are evaluated against query logic including but not limited to Boolean logic. According to an aspect of the invention, the phrases identified by their canonical expression id can be evaluated with respect to the Boolean table, which encodes the relationship of canonical expressions. More specifically, an iterative transitive closure methodology can be executed. Applying the Boolean table to the expression ids it can be determined that expression id 1 and 2 are children, each with Boolean weights of one, of parent expression id 5 with a target weight of two. Since only expression id 1 has been identified, the sum of child Boolean weights is only one, which is not greater than or equal to the target weight of parent expression id 5, so 1 is eliminated. Expression ids 3 and 4 are root nodes and thus are valid at least because of this fact. Further, expression id 3 has been selected and has a Boolean weight of one. Its parent expression id 7 has a target Boolean weight of one. Expression id 7 has an additional child expression id 2 with a weight of one. However, expression id 2 has not been selected so the Boolean weight is equal to the target Boolean weight thereby making expression id 7 valid in addition to expression ids 3 and 4. At 1130, the matching queries are identified. Continuing with the example, this can correspond to joining the expression ids from the Boolean evaluation with the final expression table 760 to identify matching queries from the query table 710. In particular, expression ids 3, 4 and 7 correspond to query keys 2, 3, and 5, respectively. In query table 710, query keys 2, 3, and 5 correspond to "'Presidential Election' NEAR 'International Relationship'," "Hurricane Ivan," and "'Presidential Election' OR 'Defense Spending'," respectively.

Figure 12:
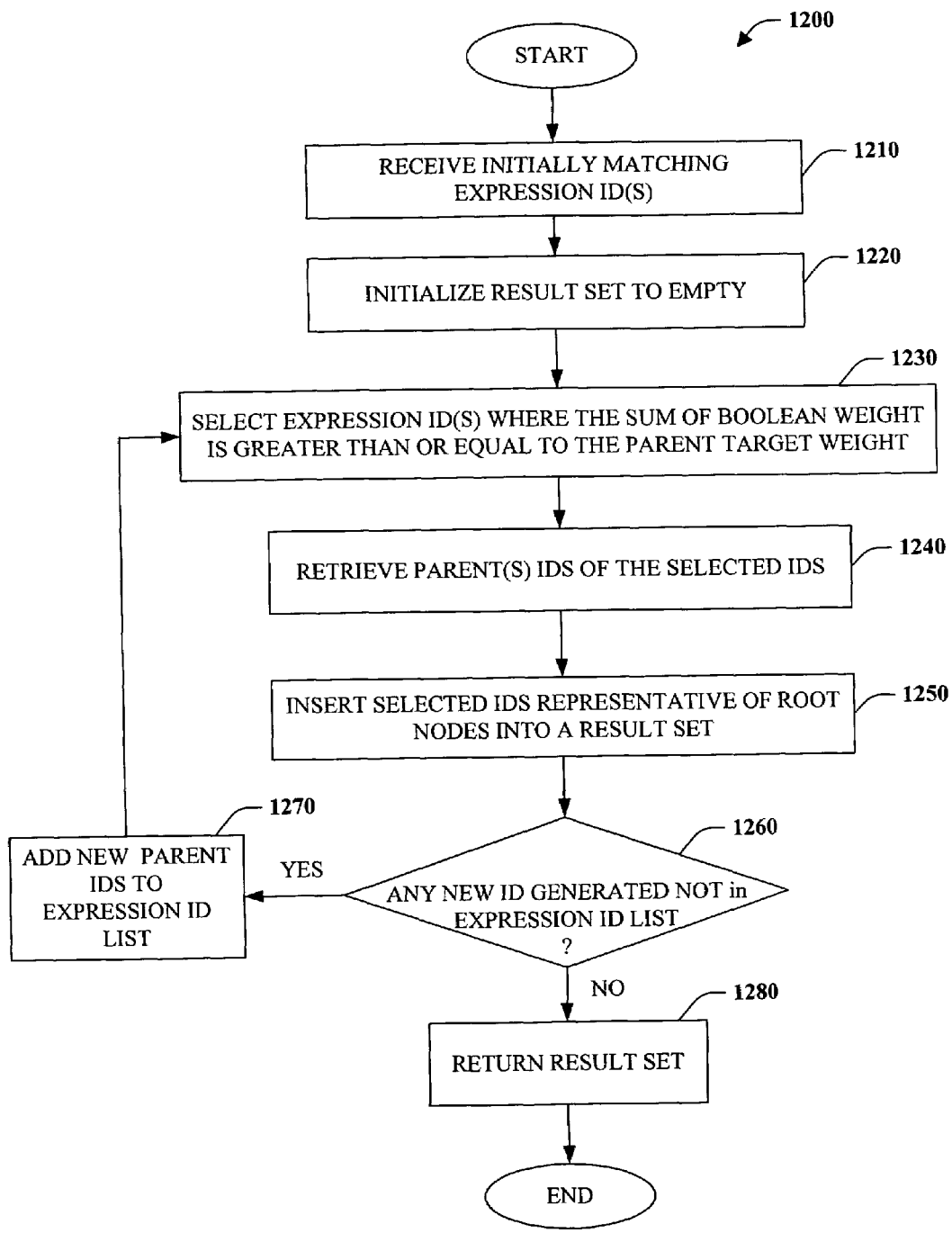
FIG. 12 is a flow chart diagram of a Boolean evaluation methodology in accordance with an aspect of the subject invention.

FIG. 12 depicts a Boolean evaluation methodology 1200 in accordance with an aspect of the subject invention. At 1210, initially matching expression ids are received. Such received expression ids can be put in a list called Expression Id List, for example. These expression ids can be generated utilizing a canonical table to identify matching phrases, wherein the matching phrases have corresponding expression ids. In the previous example, these expression ids were 4, 1, and 3. At 1220, result set is initialized to empty. At 1230, expression ids are selected where the sum of the Boolean weights are greater than or equal to the parent target value. It should be noted that some expression ids are root nodes and therefore have a parent target weight of zero. Furthermore, an expression id can correspond to a root node and a child. In the example, the expression ids that are greater than the parent target value are 4 as a root node, 3 as a root node, and 3 as a child of expression id 7. At 1240, the parent expression ids are retrieved. For example, in this case the parent expression ids will be 0, 7, and 0 for child expression ids 4, 3, and 3, respectively. The parent expression ids of zero identify root nodes. At 1250, selected identifier(s) representative of root node(s) are inserted into a result set. At 1260, a check is made to determine if there are any new expression ids generated by the action 1240 which are not already there in the list of expression ids. For example, are there any new parent identifiers that are greater than zero? If yes, then the new parent identifiers are added to the expression id list at 1270. Subsequently, the method can proceed as previously described at 1230 where the expression ids parent ids are retrieved. In this manner, the method can continue until an entire Boolean expression tree is evaluated. If at 1260, there no more new expression identifiers, then the method can return the result set at 1280. The method can terminate upon return of the of the result set.

Figure 13:
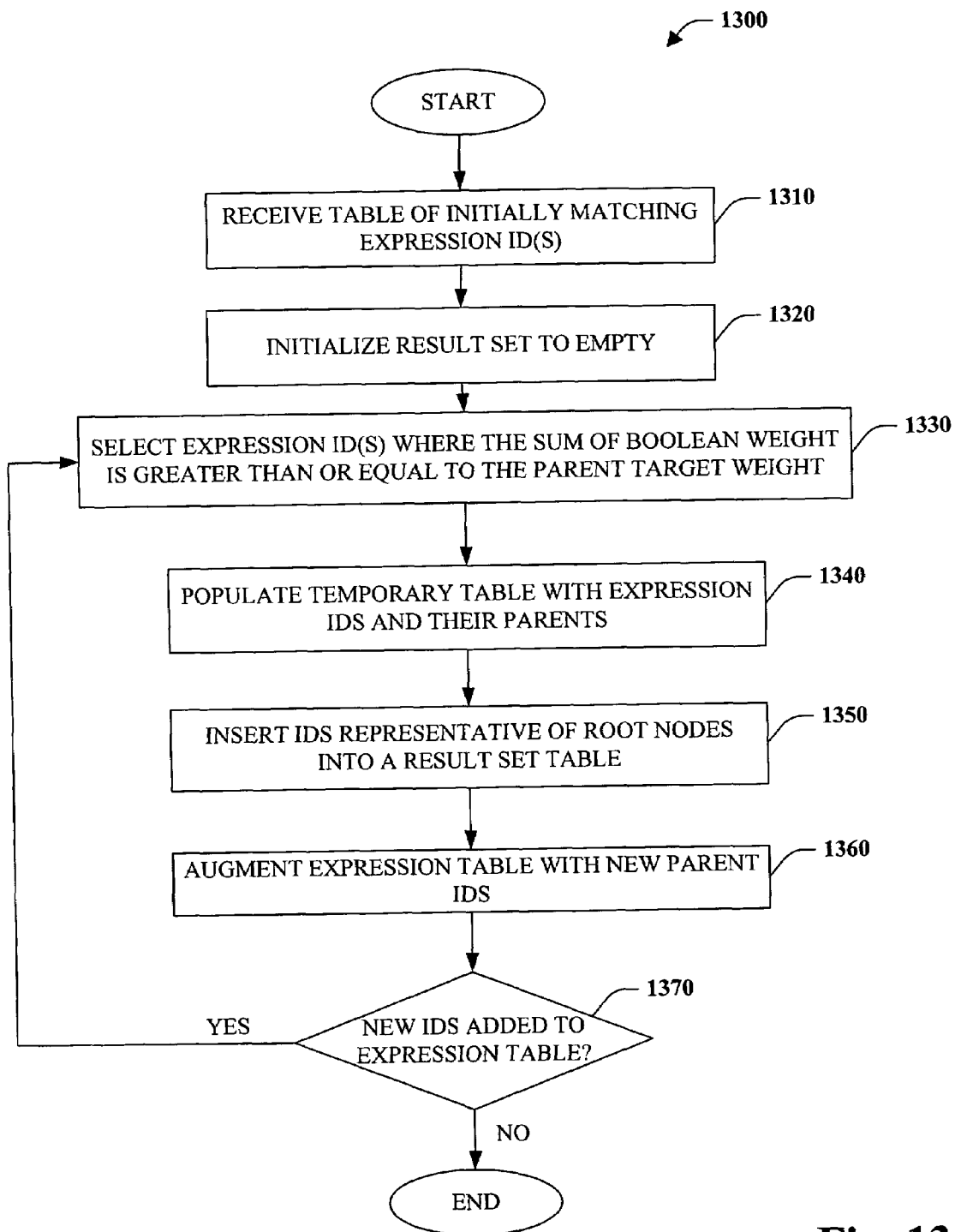
FIG. 13 is a flow chart diagram of a Boolean evaluation methodology in accordance with an aspect of the subject invention.

FIG. 13 illustrates a Boolean evaluation methodology 1300 in accordance with an aspect of the subject invention. At 1310, a table is received of initially matching expression ids. The initially matching ids can be determined by comparing received text with query phrases in a canonical table, each phrase including an expression identifier. By way of example, the following expression table could be received.

TABLE A

| Expression ID |
| --- |
| 4 |
| 1 |
| 3 |

At 1320, a result set is initialized as empty. At 1330, expression ids are selected where the sum of Boolean weights associated with each expression id are greater than or equal to the parent target weights. The expression id and Boolean weights can be determined from a Boolean table that encodes the Boolean relationships between expression ids. At 1340, a temporary table (a.k.a. New Delta) can be populated with the select expression ids and its parent expression ids. Furthermore, the expression id can be renamed child expression id while the parent expression id can be renamed simply expression id to facilitate further iterative processing. The following is an example of a temporary table as described:

TABLE B

| Child Expression ID | Expression ID |
|---|---|
| 4 | 0 |
| 3 | 7 |
| 3 | 0 |

In Table B, the child expression ids indicate the selected expression ids and the expression id denotes the identifier associated with the parent expression id. Furthermore, a child expression id associated with a parent expression id of zero indicates that the child expression id is a root node in a Boolean expression query tree. At 1350, the child expression ids that are representative of or correspond to a root node are inserted into a result set or result set table. Since, child expression ids 4 and 3 correspond to root nodes these ids can be inserted into the result set table, Table C. For example:

TABLE C

| Expression ID |
|---|
| 4 |
| 3 |

At 1360, the expression table is augmented with the new parent expression ids or simply expression ids of Table B that are non-zero and not already present in Table A. Non-zero expression ids represent nodes and such nodes should be analyzed in accordance with this methodology. In the on going example, an updated expression table would include the previous values of Table A as well as newly added expression id 7 as denoted in the following table:

TABLE D

| Expression ID |
|---|
| 4 |
| 1 |
| 3 |
| 7 |

At 1370, a determination is made concerning whether some new expression was added to the expression table. If no new expression is added, then the method simply terminates and the result set table includes the expression ids that satisfy the Boolean constraints. If the expression table is not empty, then the method will proceed to 1330 again where expression id weights are evaluated. The method continues until no new expression is added to the expression table.

To complete the example, it is noted that the expression table, Table D, includes a new element. Accordingly, at 1340, a temporary table is generated including the expression ids and its parent ids. Furthermore, to facilitate processing, expression ids are identified as child expression ids and the parent expression ids can be referred to simply as the expression ids. With respect to the subject example, the following table will be produced:

TABLE E

| Child Expression ID | Expression ID |
|---|---|
| 7 | 0 |
| 4 | 0 |
| 3 | 7 |
| 3 | 0 |

As illustrated child expression id 7 is a root level node, because its expression id is a zero. Hence, at 1350, the expression id 7 is inserted into the result set table. Now the result set table is as follows:

TABLE F

| Expression ID |
|---|
| 4 |
| 3 |
| 7 |

At 1360, an attempt is made to populate the expression table with the parent expression ids. However, there are none available, as the parent id for expression id 7 is 0. At 1370, a check is made to determine if new parent IDs are generated to be added, and at this point there is none. Hence, the method can terminate with expression ids satisfying the Boolean constraints contained in the result set table, here, Table F.

In accordance with an aspect of the invention, the tables of method 1300 can be created and otherwise manipulated utilizing SQL (Structured Query Language). The following provides SQL pseudo code for performing the Boolean evaluation, where PartialResultSet is initially empty and PartialDelta is the result set of the base matching function that identifies matching query phrases or items:

```
PartialResultSet = Empty
PartialDelta = Resultset of Base matching function
Select @resultcount = count(*) from PartialDelta
@diff = @resultcount
While ( @diff > 0 ) do
Begin
    SELECT INTO #NewDelta b.ChildExpressionId,
b.ParentExpressionId as ExpressionId
        FROM PartialDelta a JOIN Boolean_Reverse_Query b
        ON a.ExpressionId = b.ChildExpressionId
        GROUP BY b.ParentExpressionId, b.ParentTargetValue
        HAVING SUM(b.BooleanWt) >= b.ParentTargetValue
    Insert into PartialResultSet Select ChildExpressionId as ExpressionId
from #NewDelta where ExpressionId = 0
    Insert into PartialDelta = PartialDelta UNION (#NewDelta –
PartialDelta)
    Truncate table #NewDelta
    Select @newcount = count(*) from PartialDelta
    @diff = @newcount–@resultcount
        @resultcount = @newcount
End
```

Figure 14:
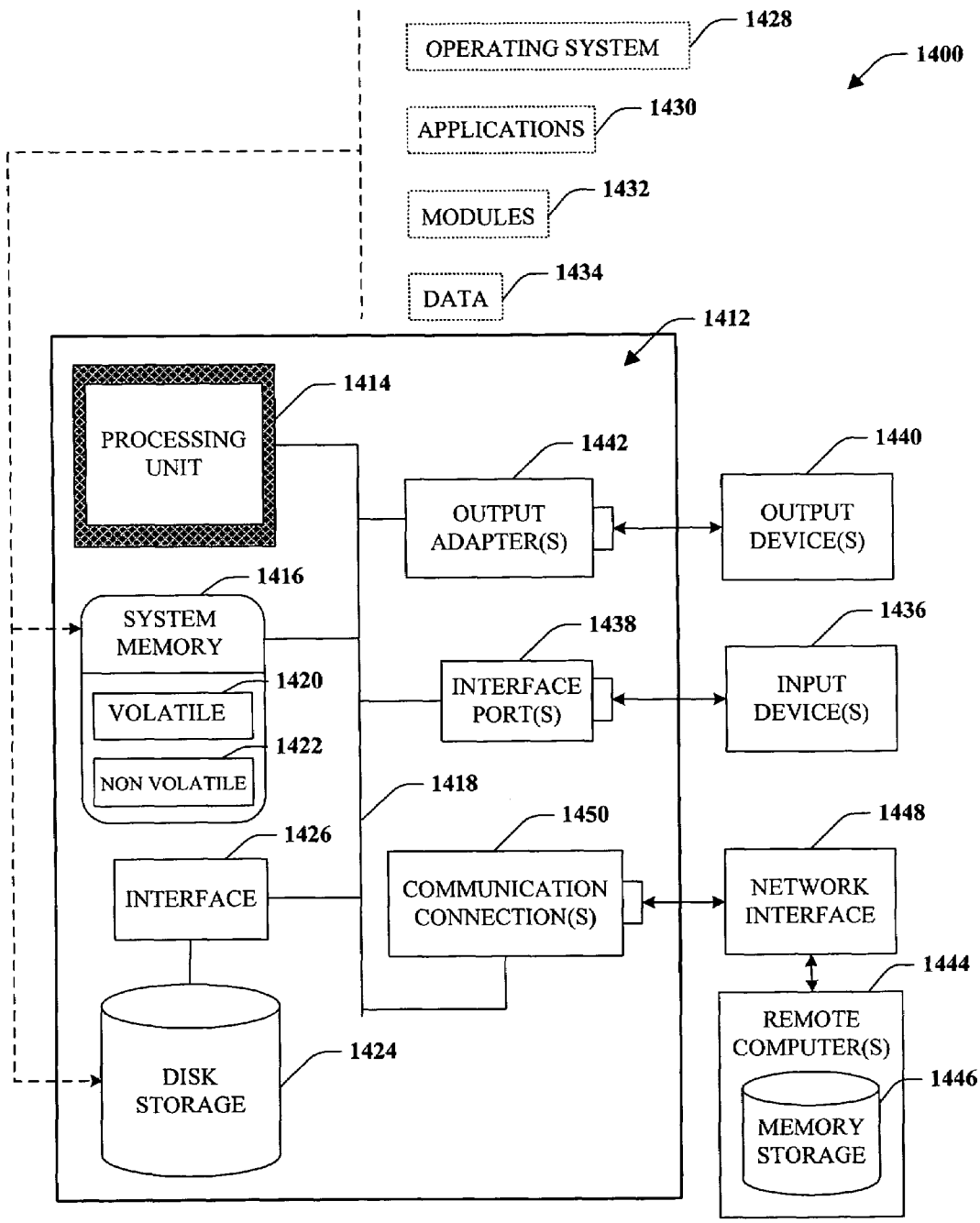
FIG. 14 is a schematic block diagram illustrating a suitable operating environment in accordance with an aspect of the present invention.
Figure 15:
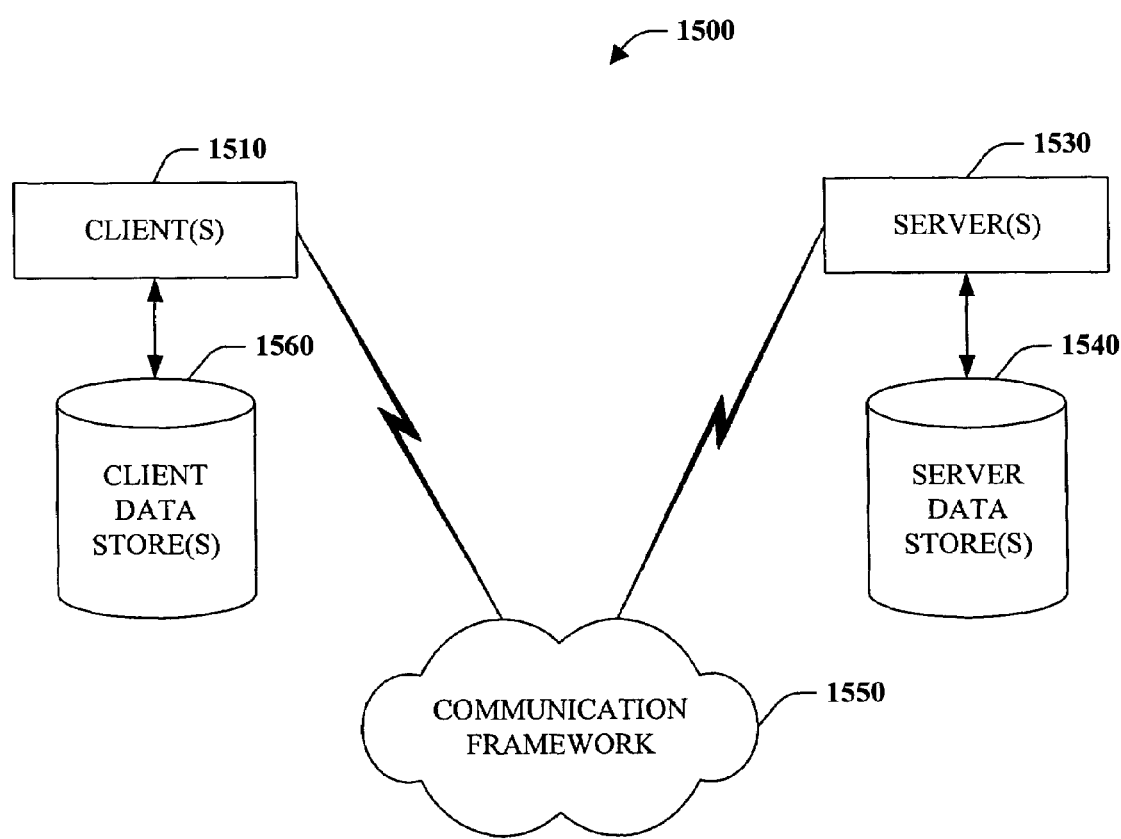
FIG. 15 is a schematic block diagram of a sample-computing environment with which the present invention can interact.

In order to provide a context for the various aspects of the invention, FIGS. 14 and 15 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 14, an exemplary environment 1400 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example disk storage 1424. Disk storage 1624 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the present invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412 and to output information from computer 1412 to an output device 1440. Output adapter 1442 is provided to illustrate that there are some output devices 1440 like displays (e.g., flat panel and CRT), speakers, and printers, among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems, power modems and DSL modems, ISDN adapters, and Ethernet cards.

FIG. 15 is a schematic block diagram of a sample-computing environment 1500 with which the present invention can interact. The system 1500 includes one or more client(s) 1510. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The server(s) 1530 can house threads to perform transformations by employing the present invention, for example. One possible communication between a client 1510 and a server 1530 may be in the form of a data packet transmitted between two or more computer processes. The system 1500 includes a communication framework 1550 that can be employed to facilitate communications between the client(s) 1510 and the server(s) 1530. The client(s) 1510 are operatively connected to one or more client data store(s) 1560 that can be employed to store information local to the client(s) 1510. Similarly, the server(s) 1530 are operatively connected to one or more server data store(s) 1540 that can be employed to store information local to the servers 1530.

What has been described above includes examples of the subject invention. It is, of course, not possible to describe every conceivable combination of components or methodologies for purposes of describing the subject invention, but one of ordinary skill in the art may recognize that many further combinations and permutations of the present invention are possible. Accordingly, the invention is intended to embrace all such alterations, modifications and variations that fall within the spirit and scope of the appended claims. Furthermore, to the extent that the terms "includes," "has," and "having" are used in either the detailed description or the claims, such term is intended to be inclusive in a manner similar to the term "comprising" as "comprising" is interpreted when employed as a transitional word in a claim.

What is claimed is:

1. A database reverse-query system coupled to a computer readable storage medium, said database reverse-query system comprising:
    a match component that analyzes text from a document and identifies preliminary query phrases that match at least a portion of text in the document; and
    a generation component that generates a canonical table, a Boolean table, and an expression table, the canonical table including canonical expressions formed at least in part as sub-expressions derived from the preliminary query phrases, the Boolean table specifying logic relationships among the canonical expressions, and the expression table comprises a mapping of preliminary query phrase identifiers to canonical expression identifiers based on the Boolean table,
    wherein the Boolean table is populated the with child expression identifiers each corresponding to a respective child expression, Boolean weights for each child expression, parent expression identifiers, and parent expression target weights, and
    wherein said Boolean table produces the same parent expression identifier whenever the child expression identifiers and the Boolean weights are the same.

2. The system of claim 1, the match component includes a proximity component that matches phrases within a specified proximity of one or more other phrases.

3. The system of claim 2, the match component includes at least one of a thesaurus component that matches text to query phrase synonyms and an inflection component that matches text to inflectional forms of the query phrases.

4. The system of claim 1, further comprising a relevance component that determines the relevance of query matches.

5. The system of claim 1, wherein the Boolean table provides Boolean constraints amongst query phrases.

6. A computer implemented method, said method when executed by a processor causes the processor to perform the step:
    receiving a query table that identifies queries to be matched;
    generating a canonical table that identifies one or more phrases of a query by respective identifiers, based at least in pan on information provided by the query table;
    generating a Boolean table that encodes Boolean relationships between the one or more phrases utilizing the identifiers, wherein generating the Boolean table populates the child expression identifiers corresponding to each respective child expression, Boolean weights for each child expression, parent expression identifiers, and parent expression target weights, and
    wherein said Boolean table produces a same parent expression identifier whenever the child expression identifiers and the Boolean weights are the same; and
    generating a final expression table that maps one or more identifiers to an original query provided in the query table using the Boolean table.

7. The method of claim 6, the same identifier is specified in the canonical table for identical phrases regardless of whether the phrases belong to different queries.

8. A computer implemented query matching methodology coupled to a computer readable storage medium, said computer when executed by a processor causes the processor to perform the steps:
    generating a query table comprising preliminary query phrases and corresponding query keys;
    receiving a text and analyzing the received text to identify preliminary query phrases that match the received text;
    generating a canonical table comprising canonical expressions formed from original phrases of the preliminary query phrases or derivations thereof;
    generating a Boolean table defining root expression nodes, leaf expression nodes from the canonical expressions and defining logical relationships among the root and leaf expression nodes, wherein the Boolean table is populated the with child expression identifiers each corresponding to a respective child expression, Boolean weights for each child expression, parent expression identifiers, and parent expression target weights, and
    wherein said Boolean table produces the same parent expression identifier whenever the child expression identifiers and the Boolean weights are the same; and
    generating a final expression table comprising a mapping of root expression nodes to query keys based on the Boolean table.

9. The method of claim 8, the generating the final expression table including evaluating weights assigned to the relationships among the root and leaf expression nodes.

10. The method of claim 8, the generating the canonical table including deriving alternate expressions from the original phrases using thesaurus based or inflection based transformations.

11. The method of claim 8, the evaluating the weights including summing weights assigned to leaf expression nodes and comparing the summed weights to a root expression node target weight.

* * * * *